United States Patent [19]
Honda et al.

[11] Patent Number: 5,833,264
[45] Date of Patent: Nov. 10, 1998

[54] INFLATOR ASSEMBLY FOR A VEHICLE AIR BAG SYSTEM

[75] Inventors: Kiyoshi Honda; Seiichiroh Kobayashi; Yoshinobu Tada, all of Saitama-ken, Japan

[73] Assignee: Honda Giken Kogyo Kabushiki Kaisha, Tokyo, Japan

[21] Appl. No.: 744,945

[22] Filed: Nov. 7, 1996

[30] Foreign Application Priority Data

| Nov. 10, 1995 | [JP] | Japan | 7-317427 |
| Nov. 14, 1995 | [JP] | Japan | 7-319480 |
| Nov. 16, 1995 | [JP] | Japan | 7-322385 |
| Nov. 20, 1995 | [JP] | Japan | 7-326355 |
| Nov. 20, 1995 | [JP] | Japan | 7-326356 |

[51] Int. Cl.⁶ ................................. B60R 21/26
[52] U.S. Cl. ........................... 280/741; 280/740
[58] Field of Search ................ 280/736, 737, 280/741, 732, 740

[56] References Cited

U.S. PATENT DOCUMENTS

| 4,950,458 | 8/1990 | Cunningham | 280/741 |
| 4,998,751 | 3/1991 | Paxton et al. | 280/741 |
| 5,109,772 | 5/1992 | Cunningham et al. | 280/741 |
| 5,407,223 | 4/1995 | Lauritzen et al. | 280/732 |
| 5,407,226 | 4/1995 | Lauritzen et al. | 280/732 |
| 5,511,819 | 4/1996 | Spilker et al. | 280/732 |

FOREIGN PATENT DOCUMENTS 5-319199 12/1993 Japan.

*Primary Examiner*—Paul N. Dickson
*Attorney, Agent, or Firm*—Armstrong, Westerman, Hattori, McLeland & Naughton

[57] ABSTRACT

The inflator assembly comprises a cylindrical housing main body which is made by extrusion so that it is possible to achieve a desired cross section which optimizes the progress of combustion of the propellant while minimizing the size of the housing. In particular, by using a member clad or mounted with brazing material for an internal component of the assembly, such as the ignition pipe, a leg section for supporting the ignition pipe inside the housing, a wall section for defining a separate combustion chamber, at least one of the end plates for closing the axial ends of the housing main body, and a perforated plate member serving as the perforated section, it is possible to simplify the manufacturing process, and thereby reduce the manufacturing cost.

27 Claims, 14 Drawing Sheets

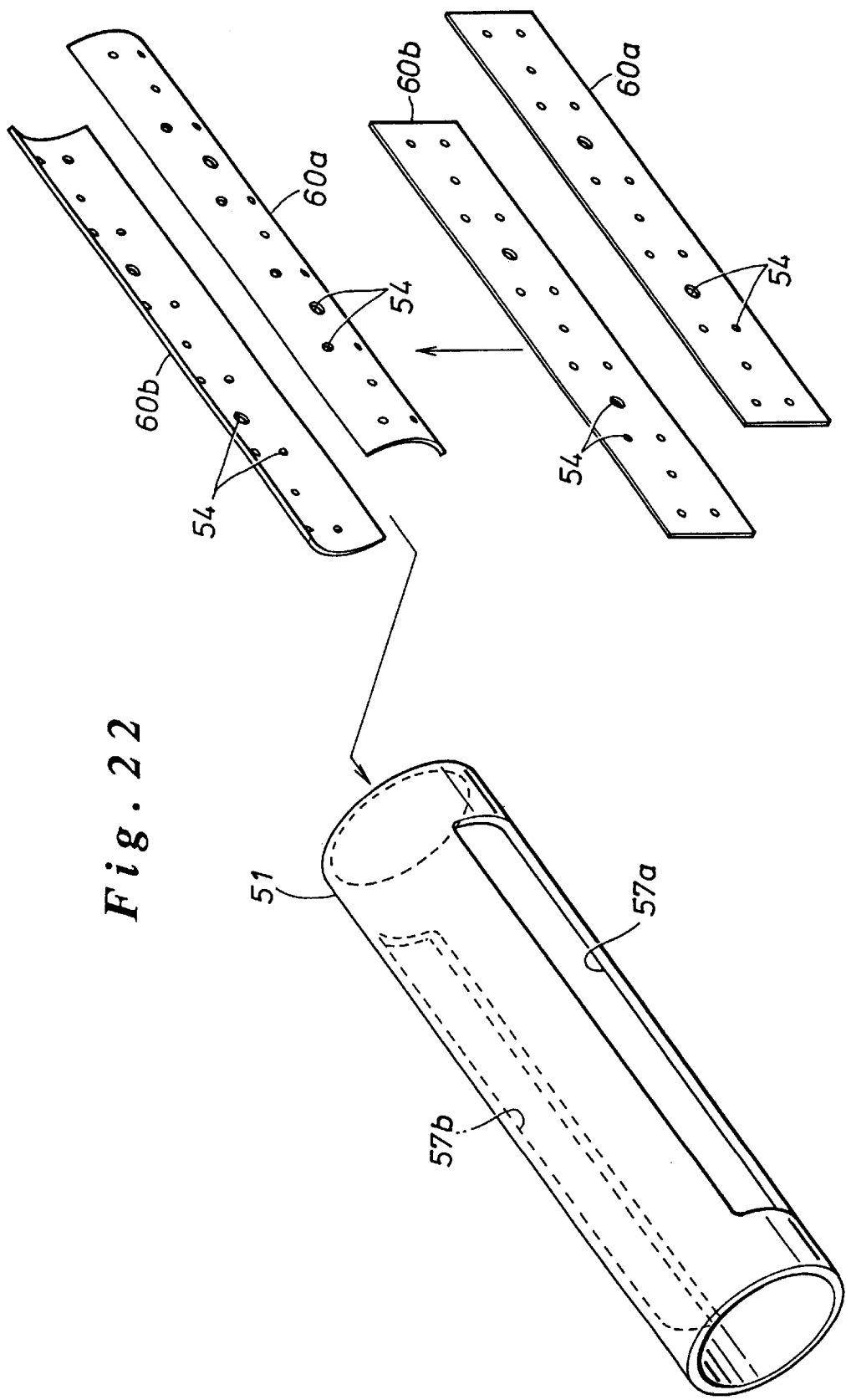

INFLATOR ASSEMBLY FOR A VEHICLE AIR BAG SYSTEM

TECHNICAL FIELD

The present invention relates to an inflator assembly for deploying an air bag which is used for restraining a vehicle occupant in a high deceleration situation, and in particular to an inflator assembly having a plurality of combustion chambers defined therein.

BACKGROUND OF THE INVENTION

To protect a vehicle occupant from the impact of a vehicle crash, air bag systems are increasingly widely installed in motor vehicles. Typically, such an air bag system is incorporated with an inflator for producing the gas required for inflating the air bag. The inflator is compactly folded and stowed in the center of the steering wheel or in the dashboard which is located immediately in front of the vehicle occupant. The inflator contains a propellant which, upon ignition, rapidly burns and produces the gas required for rapidly deploying the air bag. An inflator of this type is disclosed, for instance, in Japanese patent laid-open publication (kokai) No. 5-319199.

In such an inflator, because a substantial amount of the thermal energy produced from the initial combustion of the propellant is dissipated to the housing of the inflator and the air bag, some initial time delay in deploying the air bag is inevitable. This is particularly pronounced because of the fact that the combustion of the propellant progresses at a constant rate, and the initial build up of the pressure is not thermodynamically efficiently utilized. Such a time delay may be compensated for by increasing the amount of the propellant used, but it leads to an undesirable increase in the size and weight of the inflator.

To overcome such a problem, it is conceivable to control the rate of the combustion of the propellant. For instance, the housing may be divided into two chambers so that the propellant of the first chamber, which is normally smaller than the second chamber, is ignited first, and that the resulting flame is introduced into the second chamber, via communication holes provided in the side wall separating the two chambers, to ignite the propellant in the second chamber. The combustion gas resulting from the combustion of the propellant in the first chamber is used for preheating the housing and the air bag, and for slightly inflating the air bag. The combustion of the propellant in the second chamber produces the gas at such a rate that is required to rapidly deploy the air bag.

The housing for an inflator assembly serves as a pressure vessel, and the interior of the housing is required to be divided into a number of separate chambers. Also, the ignition pipe for producing the ignition flashes is required to be accurately positioned inside the housing. Therefore, the structure of the housing tends to be complicated, and this undesirably increases the manufacturing cost.

Conventionally, the housing was provided with a circular cross section so as be able to withstand the pressure which develops inside the housing when the propellant burns. However, the inventors have discovered the fact that a circular cross section is detrimental to the optimum performance of the inflator. Because the produced gas is required to be directed in a specific direction, the perforation which may be formed on one side of the housing does not provide a sufficient passage area. Also, because the outer wall of the inflator housing is generally curved, it is difficult to form a large number of holes for gas ejection in an economical manner with a required precision.

The outlet of the gas from the inflator assembly is required to have a filter to prevent solid residues and other foreign matters from being projected toward the air bag. It is therefore essential to employ a favorable filter structure for the manufacturing cost to be minimized while the performance of the inflator assembly is maximized.

BRIEF SUMMARY OF THE INVENTION

In view of such problems of the prior art, a primary object of the present invention is to provide an inflator assembly for a vehicle air bag system which can be manufactured with a required precision at a low cost.

A second object of the present invention is to provide an inflator assembly for a vehicle air bag system which is compact in size and easy to manufacture.

A third object of the present invention is to provide an inflator assembly for an air bag system which is reliable in use.

According to the present invention, these and other objects can be accomplished by providing an inflator assembly for a vehicle air bag system, comprising: a cylindrical housing main body having at least one perforated section formed on one side of the housing main body, and containing a propellant in a combustion chamber defined inside the housing main body, the perforated section being provided with a plurality of through holes; an ignition pipe containing an igniting agent therein and provided with a plurality of holes for emitting igniting flashes into the combustion chamber; and end plates closing two axial ends of the housing main body; the cylindrical housing main body being formed by extruding metallic material into a hollow cylindrical member having a prescribed cross section.

Because the housing main body is made by extrusion, it is possible to achieve a desired cross section which optimizes the progress of combustion of the propellant while minimizing the size of the housing. In particular, by using a member clad or mounted with brazing material for an internal component of the assembly, such as the ignition pipe, a leg section for supporting the ignition pipe inside the housing, a wall section for defining a separate combustion chamber, at least one of the end plates for closing the axial ends of the housing main body, and a perforated plate member serving as the perforated section, it is possible to simplify the manufacturing process, and thereby reduce the manufacturing cost.

Because the housing main body and other component parts can be made by extruded members, it is possible to adapt the assembly to different capacities simply by changing the axial length of the assembly. Therefore, a common extruded member can be used for a number of different applications.

Both of the end plates may be brazed or welded to the housing main body if at least one of the end plates is provided with an opening for placing an igniting agent or a propellant inside the housing main body which can be closed with plug means.

According to a preferred embodiment of the present invention, the ignition pipe extends substantially over an entire length of the housing main body so that the combustion of the propellant can uniformly progress over the entire length of the ignition pipe, and a controlled but rapid deployment of the air bag can be made possible. It is therefore important to place the ignition pipe accurately, in particular exactly in parallel with the axial line of the housing main body. It can be most simply accomplished if the ignition pipe is directly supported on an inner surface of the housing main body.

If it is desired to place the ignition pipe centrally or otherwise spaced from the inner surface of the housing main body, the ignition pipe may be supported on an inner surface of the housing main body via a leg section. If a wall section is used for defining a separate combustion chamber which communicates with both the ignition pipe and a remaining part of the housing main body so as to optimize the progress of combustion, such a wall section may be used for supporting the ignition pipe inside the housing main body. According to a particularly preferred embodiment of the present invention, the ignition pipe is supported by both a wall section and a leg section from diagonally opposing directions so that the ignition pipe can be extremely securely fixed inside the housing main body. Such an arrangement is obviously beneficial in minimizing the material cost and the overall size of the assembly without compromising the mechanical strength of the various components.

The housing main body is preferred to have a circular cross section in view of the capability to withstand pressure. However, a circular cross section will provide only a limited area for forming the perforated section because the through holes are desired to be directed in a prescribed direction. It is therefore advantageous to provided a relatively planar side so that the perforated section may be provided in the relatively planar side of the housing main body. It is particularly preferable to use an elliptic or race-track shaped cross section so that these two requirements may be met both satisfactorily.

The perforated section is preferably formed by a perforated plate member which is attached to the housing main body so as to close a window opening provided in the housing main body. Thus, even when the perforated section is provided with a curved profile, the process for forming the through holes of the perforated section can be easily accomplished because the through holes can be formed in a flat plate member, and the flat plate member may be then curved into the prescribed curvature. This is substantially easier than forming a number of through holes in a curved outer wall section of the housing main body. A pair of guide ridges may be formed in parts of an inner surface of the housing main body extending along either side of the window opening for accurately positioning the perforated plate member. Alternatively, the window opening may be provided with a pair of guide grooves extending along either side of the window opening for axially receiving lateral edges of the perforated plate member to retain the perforated plate member therein.

If the perforated section consists of a separate perforated plate member, it may be placed or clad with brazing material so that it may be attached to the housing main body and/or at least one of internal components of the inflator assembly inside the housing main body by placing the assembly in a heating oven and melting brazing material which is placed or clad on the plate member to braze the perforated plate member to the housing main body and/or one of said internal components.

Normally, the perforated section is covered by a filter assembly so that any solid residues and other foreign substances resulting from the combustion of the propellant may be prevented from being thrown into the air bag. According to the present invention, the filter assembly comprises a filter element and a frame member retaining the filter element, and attached to the housing assembly so that a secure and accurate attachment of the filter assembly to the housing assembly may be achieved.

A pair of guide ridges may be formed in parts of an outer surface of the housing main body extending along either side of the window opening for accurately positioning the filter assembly. Alternatively, the window opening may be provided with a pair of guide grooves extending along either side of the window opening for axially receiving lateral edges of the frame member of the filter assembly to retain the filter assembly.

BRIEF DESCRIPTION OF THE DRAWINGS

Now the present invention is described in the following with reference to the appended drawings, in which:

FIG. 22 is a simplified exploded perspective view of an alternate arrangement for placing a pair of perforated plates on a housing main body.

DETAILED DESCRIPTION OF THE PREFERRED EMBODIMENTS

Figure 1:
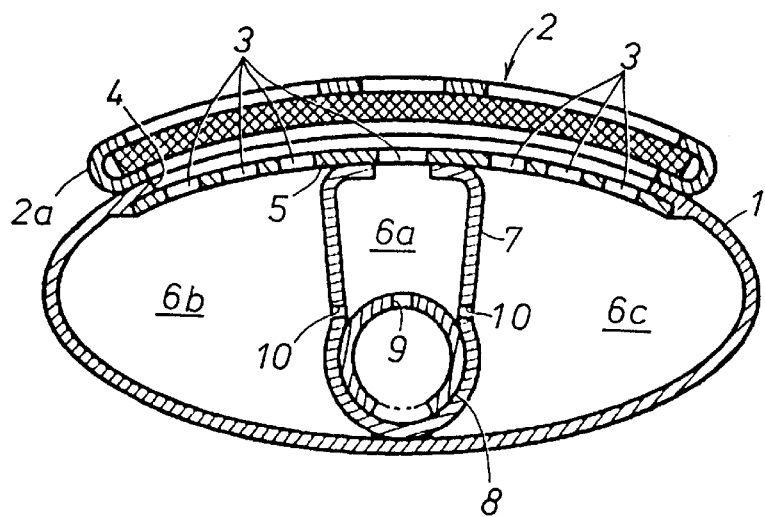
FIG. 1 is a cross sectional view of a first embodiment of the inflator assembly according to the present invention.

Referring to FIG. 1, the inflator assembly according to the present invention comprises a housing main body 1 formed by extruding an aluminum alloy into a cylindrical member having an elliptic cross section. Typically, the extruded aluminum member is cut into a desired length, and is closed by lid members not shown in the drawing at either longitudinal end. The housing is provided with a window opening 4 on a minor diameter end or a smaller curvature end of a side wall thereof, and this window opening 4 is closed by a perforated plate 5 having a number of through holes 3 formed therein which is fitted over the window opening 4 from inside the housing 1. A filter assembly 2 is placed over the perforated plate 5 to prevent solid residues and other foreign matters as well as flames from issuing out of the housing 1.

A pair of side walls 7 formed by bending a single piece of aluminum alloy plate extend centrally across the interior of the housing main body in parallel with the short radial line or the minor diameter line defining a first combustion chamber 6a between the side walls 7. A bight section defined between these side walls 7 abuts the housing wall while the other ends of the side walls 7 abut the opposing perforated plate 5. Therefore, the remaining part of the interior of the housing main body 1 is further divided into second and third chambers 6b and 6c which are each defined between one of the side walls 7 and the opposing wall of the housing main body 1 in a mutually symmetric relationship about the line of symmetry of the housing main body 1 passing centrally through the first combustion chamber 6a along the minor diameter line of the housing main body 1.

A cylindrical ignition pipe 8 containing a fuse-like ignite is received between the side walls 7 adjacent the bight section. The ignition pipe 8 is provided with a plurality of small holes 9, which are directed upward as seen in FIG. 1, for emitting ignition flashes into the first chamber 6a and burning the propellant filled in the first chamber 6a. The side walls 7 slightly diverge as they extend away from the ignition pipe 8.

The side walls 7 are provided with communication holes 10 which are arranged in a single row on each side wall, and immediately above the parts of the side walls attached to the ignition pipe 8. The positioning of these holes 10 is important in controlling the propagation of the combustion in the second and third chambers 6b and 6c.

The frame member 2a of the filter assembly 2, the perforated plate 5, the side walls 7 and the ignition pipes 8 are made of a brazing sheet having brazing material coated over an aluminum alloy sheet. The brazing material may be coated either only one said of the aluminum alloy sheet or both sides thereof. The sheet blanks cut and bent into prescribed shapes are assembled to the housing main body 1, and temporarily attached thereto by suitable means. Then, the entire assembly is placed in a heating oven so that the brazing material on the surface of the components melts and permanently brazes the components and the housing main body 1 together.

Figure 2:
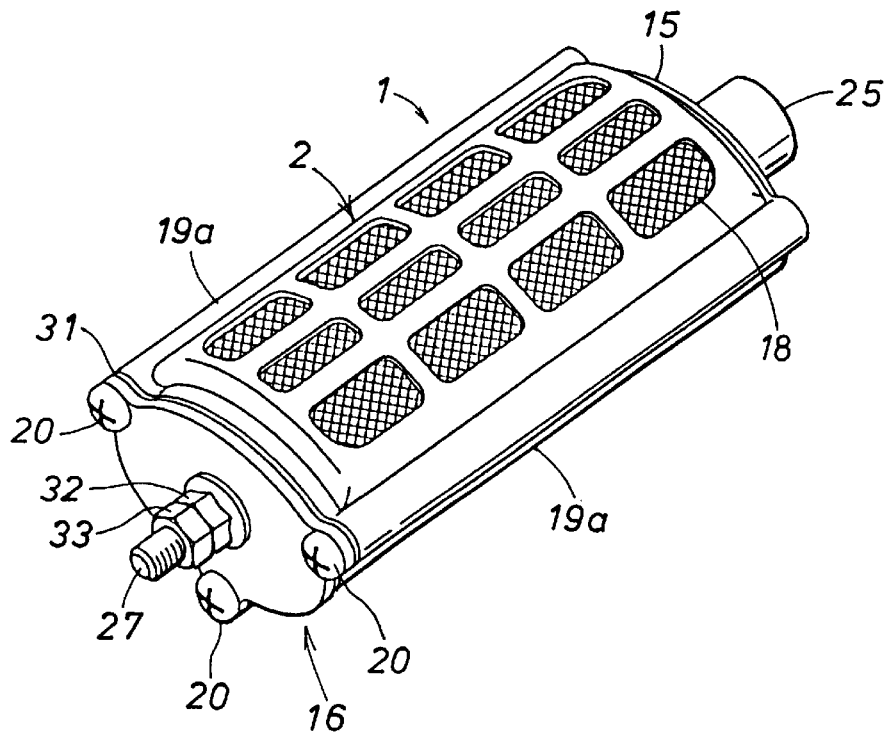
FIG. 2 is a perspective external view of a second embodiment of the inflator assembly according to the present invention.
Figure 3:
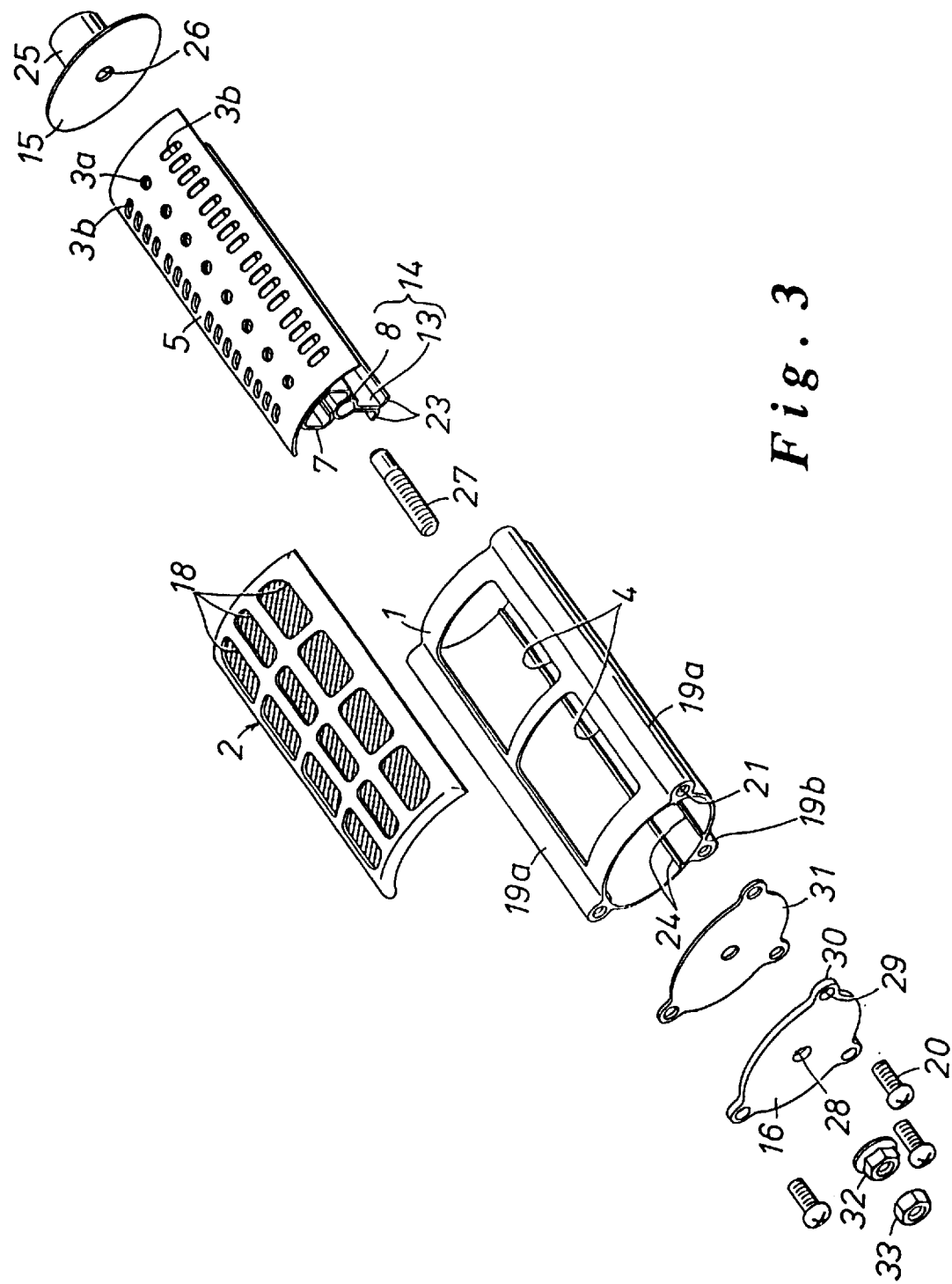
FIG. 3 is an exploded perspective view of the inflator assembly illustrated in FIG. 2.
Figure 4:
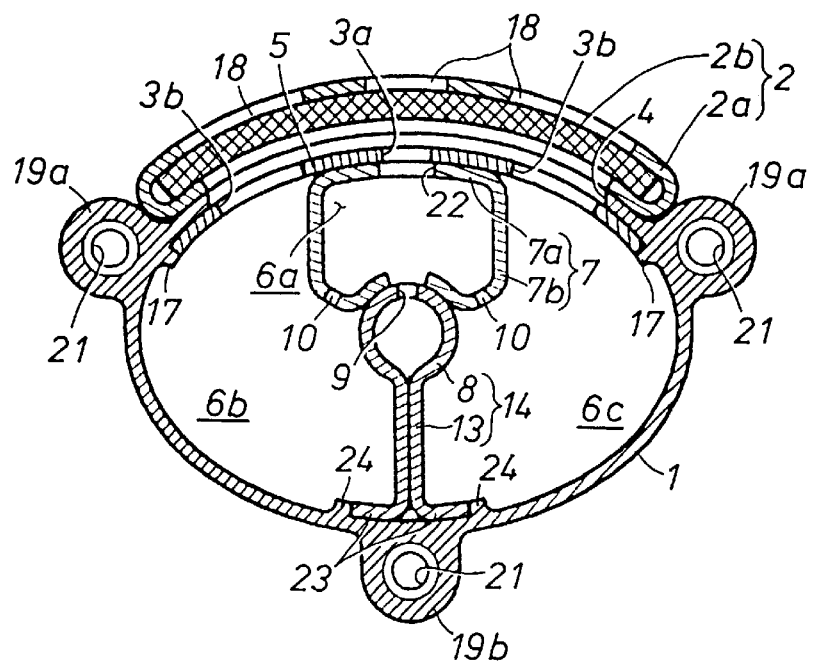
FIG. 4 is a cross sectional view of the inflator assembly illustrated in FIGS. 2 and 3.

FIGS. 2 to 4 show a second embodiment of the present invention, and in these drawings the parts corresponding to those of the previous embodiment are denoted with like numerals. This inflator assembly comprises a housing main body 1, made of an extruded aluminum alloy member, which is cylindrical in shape, and has an elliptic cross section, a filter assembly 2 placed on an outer surface of the housing main body 1, a pair of perforated plates 3 placed over two window openings 4 defined in the housing main body 1 from inside, a side wall assembly 7, an ignition pipe assembly 15 including an ignition pipe 8 and a leg section 13 supporting the ignition pipe 8 substantially centrally inside the housing main body 1, a bottom plate 15 closing one of the axial ends of the housing main body 1, and a lid plate 16 which closes the other axial end of the housing main body 1 by threaded bolts 20.

The windows openings 4 of the housing main body 1 are aligned axially along the length of the housing main body 1, and the two perforated plates 5 close these window openings 4, respectively, from inside. These perforated plates 5 are each made by cutting an aluminum plate into a prescribed rectangular shape and forming gas ejection holes 3a by stamping. At the same time, these perforated plates 4 are given with a prescribed curvature so as to conform to the housing main body 1 to which these perforated plates 5 are to be attached. The gas ejection holes 3 are formed in each of the perforated plates 5 in three rows, and the holes 3a in the central row are generally circular in shape while the holes 3b in the two outer rows are laterally elongated. These perforated plates 5 are properly positioned on the inner surface of the part of the peripheral wall of the housing main body 1 surrounding the windows openings 4 guided by a pair of ridges 17 defined along either side of the window openings 4.

The filter assembly 2 consists of a filter 2b formed by overlaying a plurality of layers of wire mesh having different properties, and a frame member 2a retaining the filter 2b, and is curved so as to conform to the outer profile of the housing main body 1. The frame member 2a is formed with a plurality of rectangular openings 18 so as to correspond to the gas ejection holes 3a and 3b of the perforated plates 5, and an outer peripheral edge of the frame member 2a is crimped inward so as to retain the filter 2b on the inner surface of the frame member 2a.

The filter assembly 2 is positioned on the outer surface of the housing main body 1 guided by a pair of ribs 19a extending longitudinally along either side of the window openings 4. These ribs 19a along with a similar rib 19b provided at a diametrically opposing position of the housing main body 1 are provided with threaded holes 21 for receiving the threaded bolts 20 for securing the lid plate 16.

The side wall assembly 7 is formed by bending a single piece of plate, and comprises an arcuate bight section 7a which is attached to the inner surface of the perforated plates 5, and a pair of side walls 7b depending from either side end of the arcuate bight section 7a. The lower end of each of the side walls 7b is bent inward, and abuts the outer surface of the ignition pipe 8. The arcuate bight section 7a is formed with through holes 22 which align with the gas eject holes 3a of the middle row. Each of the side walls 7b is formed with a plurality of communication holes 10 arranged in a single row along the axial direction. The side walls 7 thus divide the interior of the housing main body 1 into a first chamber 6a defined between the two side walls 7b, and second and third chambers 6b and 6c each defined between one of the side walls 7b and the opposing inner surface of the housing main body 1.

The ignition pipe assembly 14 is formed by bending a single piece of plate, and comprises a middle section formed into the ignition pipe 8, and a pair of vertical sections placed closely one next the other and extend downward to define the leg section 13. The lowermost part of the leg section 13 is bent laterally outward to define flanges 23 which abut the inner surface of the housing main body 1. The outer lateral edges of the flanges 23 are laterally restrained by a pair of axially extending ridges 24 formed in the housing main body 1.

The ignition pipe 8 is provided with a plurality of small holes 9 arranged in a single row and directed upward. Thus, when the ignition pipe 8 is ignited by an ignite not shown in the drawing upon receiving an activation signal from a crash sensor not shown in the drawing, ignition flashes issue from these small holes 9 and ignite the propellant received in the first chamber 6a.

The bottom plate 15 is substantially conformal to the cross section of the housing main body 1, and is provided with a central annular boss 25 extending outward. The central hole 26 of this annular boss 25 receives the ignite which is not shown in the drawing, and aligns with the inner bore of the ignition pipe 8.

The lid plate 16 is substantially conformal to the bottom plate 15, and is provided with a central hole 28 for receiving a stud bolt 27 extending from one end of the ignition pipe 8, and three tabs 30, each provided with a hole 29, at positions corresponding to the ribs 19a and 19b of the housing main body 1. A gasket 31 conformal to the lid plate 16 is interposed between the lid plate 16 and the opposing end surface of the housing main body 1.

The outer end of the stud bolt 27 is fitted with a flanged nut 32 and a lock nut 33. The outer end of the stud bolt 27 and the annular boss 25 projecting from the inflator assembly are used for mounting the assembly inside an air bag system not shown in the drawing. Therefore, the stud bolt 27 and the annular boss 25 are not essential for the invention, and can be changed according to the way it is installed in the air bag system.

The perforated plate 5, the side wall assembly 7, the ignition pipe assembly 14, the frame member 2a of the filter assembly 2, and the bottom plate 15 are made of a brazing sheet having brazing material coated over a surface or both surfaces of an aluminum alloy sheet. The sheet blanks cut and bent into prescribed shapes are assembled to the housing main body 1, and temporarily attached thereto. The stud bolt 27 is fitted into the ignition pipe 8, and the filter assembly 2 and the bottom plate are suitable mounted to the housing main body 1. Then, the entire assembly is placed in a heating oven so that the brazing material on the surface of the components melts and permanently brazes the components and the housing main body 1 together. Thereafter, an ignite is placed inside the annular boss 25 of the bottom plate 15, and the ignition agent and the propellant are filled into the ignition pipe 8 and the combustion chambers 6a to 6c, respectively. By attaching the lid plate 16 along with the gasket 31 to the housing main body 1, the inflator assembly is completed as illustrated in FIG. 2.

Figure 5:
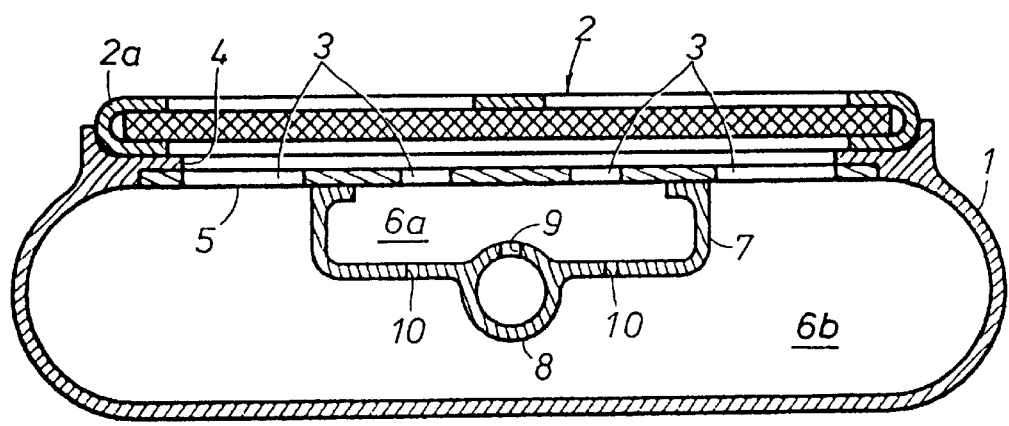
FIGS. 5 to 9 are cross sectional views of third to seventh embodiments of the inflator assembly according the present invention.

FIG. 5 shows a third embodiment of the present invention. The parts corresponding to those of the previous embodiments are denoted with like numerals. The housing main body 1 is provided with a substantially race-track shaped cross section, and a filter assembly 2 and a perforated plate 5 are placed over a side of the housing main body 1 corresponding to a shorter diameter or a part having a substantially planar surface. The ignition pipe 8 and the side walls 7 are integrally formed by extruding aluminum alloy. In this embodiment, the ignition pipe 8 is spaced from the opposing wall of the housing main body 1 remote from the perforated plate 5 so that the interior of the housing main body 1 is divided into a first chamber 6a and a second chamber 6b.

The filter assembly 2 includes a filter element 2b which is retained by a frame 2a. The frame 2a of the filter assembly 2 and the perforated plate 5 are made of brazing sheets, and the extruded member combining the ignition pipe 8 and the side walls 7 is attached to the housing main body 1 by means of the brazing material clad on the perforated plate 5. The frame 2a is also similarly attached to the housing main body 1.

Because the side of the housing main body 1 on which the perforated plate 5 is to be mounted is planar, the perforated plate 5 may consist of a flat plate, and so is the filter assembly 2. Therefore, the steps of forming the perforated plate 5 and the filter assembly 2 into curved shapes are not required, and the manufacturing process can be substantially simplified. Also, the step of forming the holes 3 for ejecting gas can be simplified. If a part of the side wall of the housing main body 1 is provided with a planar section, it can be used as a perforated plate 5 without creating any difficulty in the manufacturing process.

Figure 6:
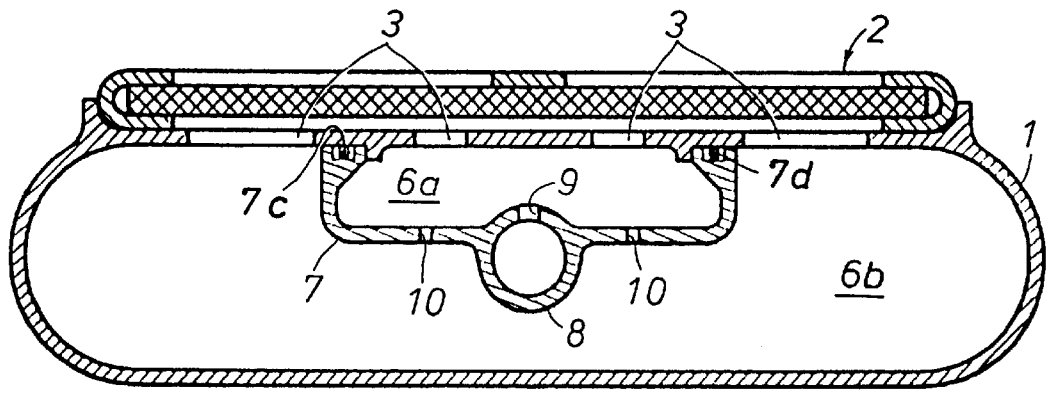

FIG. 6 shows a fourth embodiment of the inflator assembly similar to that shown in FIG. 5, but the through holes 3 for ejecting gas are formed directly in a part of the side wall of the housing main body 1. In this case, the free ends of the side walls 7 abutting the perforated section of the housing main body 1 may be each provided with a groove 7c for receiving brazing material 7d therein. By placing this assembly with the side walls 7 along with the ignition pipe 8 temporarily attached to the housing main body 1, in a heating oven, the entire assembly can be solidly joined together by brazing.

Figure 7:
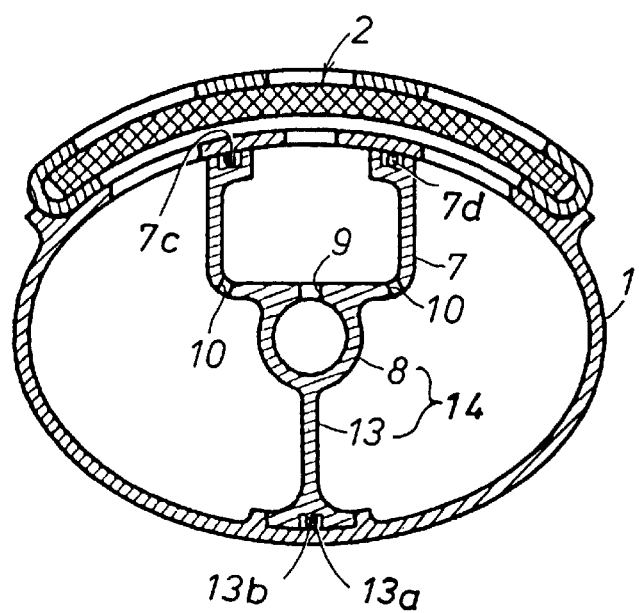

FIG. 7 shows a fifth embodiment of the inflator assembly according to the present invention. In this embodiment, the side walls 7 and the ignition pipe assembly 14 including the ignition pipe 8 and the leg section 13 are formed by a single integral extruded member. If the perforated section is formed in the housing main body 1 itself, the free ends of the side walls 7 abutting the perforated section of the housing main body 1 may be each provided with a groove 7c and brazing material 7d received therein similar to those of the previous embodiment. The free end of the leg section 13 abutting the opposing wall of the housing main body 1 is also provided with a similar groove 13a and brazing material 13b received therein. This assembly may be placed in a heating oven so that the entire assembly may be solidly joined together by brazing.

Figure 8:
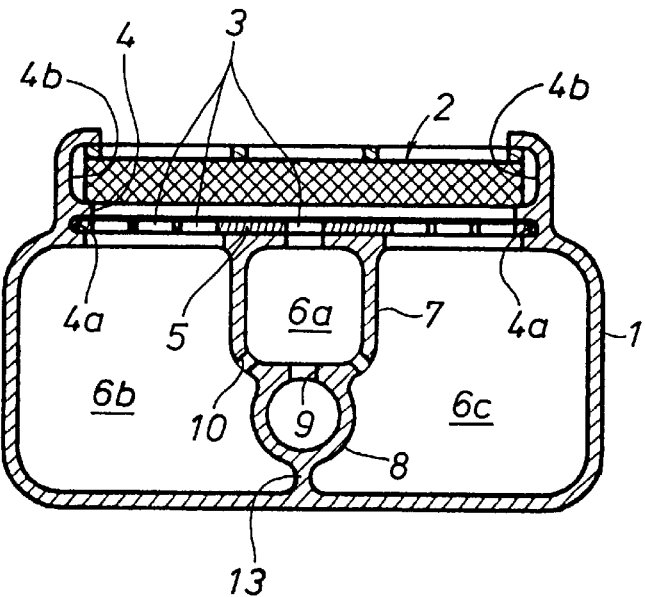
Figure 9:
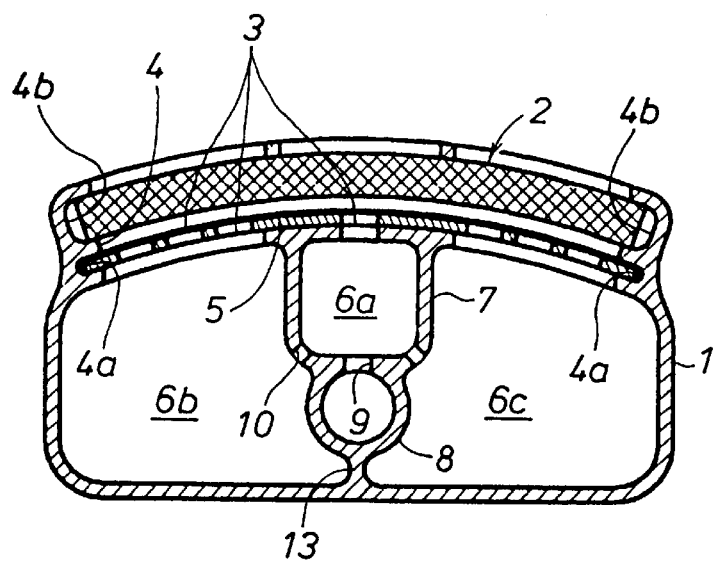

FIGS. 8 and 9 shows a sixth embodiment and a seventh embodiment of the present invention, in each of which the wall section 7 for defining a first combustion chamber 6a, the ignition pipe 8, and the leg section 13 are all formed integrally with the housing main body 1 by extruding aluminum alloy. One side of the housing main body 1 is provided with a window opening 4, and two pairs of guide grooves 4a and 4b are formed laterally along the two sides of the window opening 4. A perforated plate 5 is slidably fitted into the inner pair of guide grooves 4a from an axial end, and a filter assembly 2 is fitted into the outer pair of guide grooves 4b from an axial end. The guide grooves 4a and 4b are adapted to receive a planar perforated plate 5 and a planar filter assembly 2 in the case of the embodiment illustrated in FIG. 8, and the guide grooves 4a and 4b are adapted to receive a curved perforated plate 5 and a curved filter assembly 2 in the case of the embodiment illustrated in FIG. 9. Because the lateral edges of the filter assembly 2 and the perforated plate 5 are retained by the guide grooves 4a and 4b, the filter assembly 2 and the perforated plate 5 are prevented for warping away from the outer profile of the housing main body 1 when the entire assembly is placed in a heating oven for securing them to the housing main body 1. In particular, when the frame for the filter assembly 2 and the perforated plate 5 are curved as illustrated in FIG. 9, they tend to spring back when placed in a heating oven, and the guide grooves 4a and 4b are particularly effective in carrying out a favorable brazing process. If desired, the ridges extending along each guide groove may be crimped so that the frame for the filter assembly 2 and the perforated plate 5 may be securely retained thereby.

Figure 10:
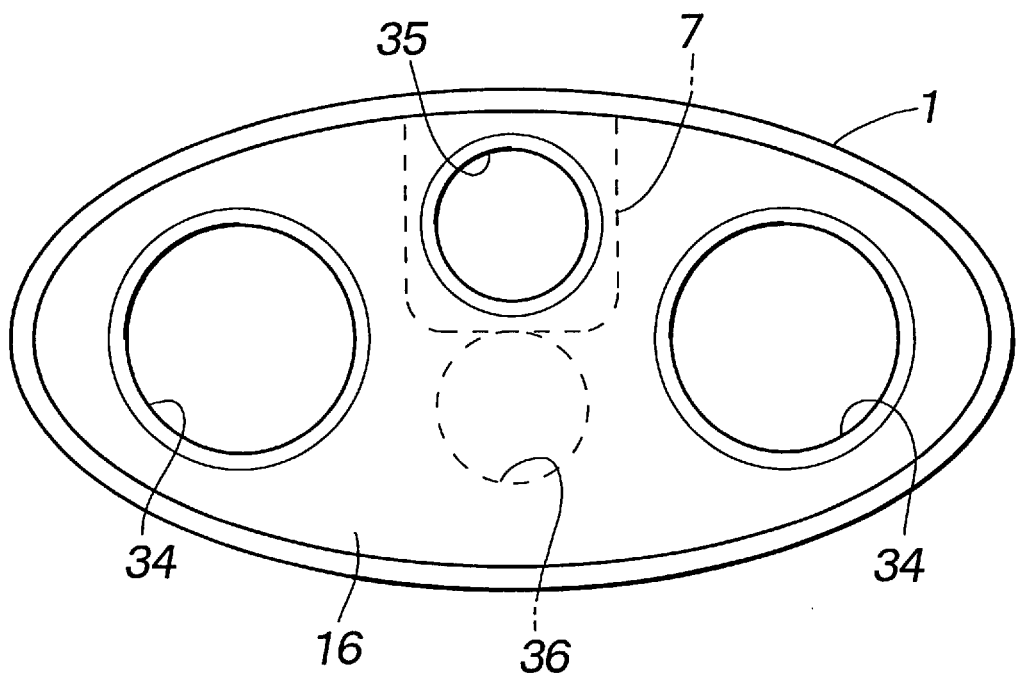
FIG. 10 is an end view of a eighth embodiment of the inflator assembly according the present invention.

FIG. 10 shows an eighth embodiment of the inflator assembly according to the present invention which is provided with a specially designed lid plate. In the previous embodiments, one of the axial ends of the housing main body 1 was closed by a lid plate 16 which is secured in position by the threaded bolts 20. It is also possible to integrally attach the lid plate 16 to the housing main body 1 by brazing or welding similarly as the bottom plate 15. In this case, the lid plate 16 may be provided with openings 34 to 36 so that the propellant and the igniting agent in the granular or pellet form may be filled into the housing main body 1 and the ignition pipe 8 from outside. These holes 34 to 36 may also be formed in the bottom plate 15 instead of the lid plate 16. If desired, these holes 34 to 36 may be formed in both of the lid plate 16 and the bottom plate 15. The holes 34 to 36 can be closed by threaded plugs or the like upon completion of the inflator assembly.

Figure 11:
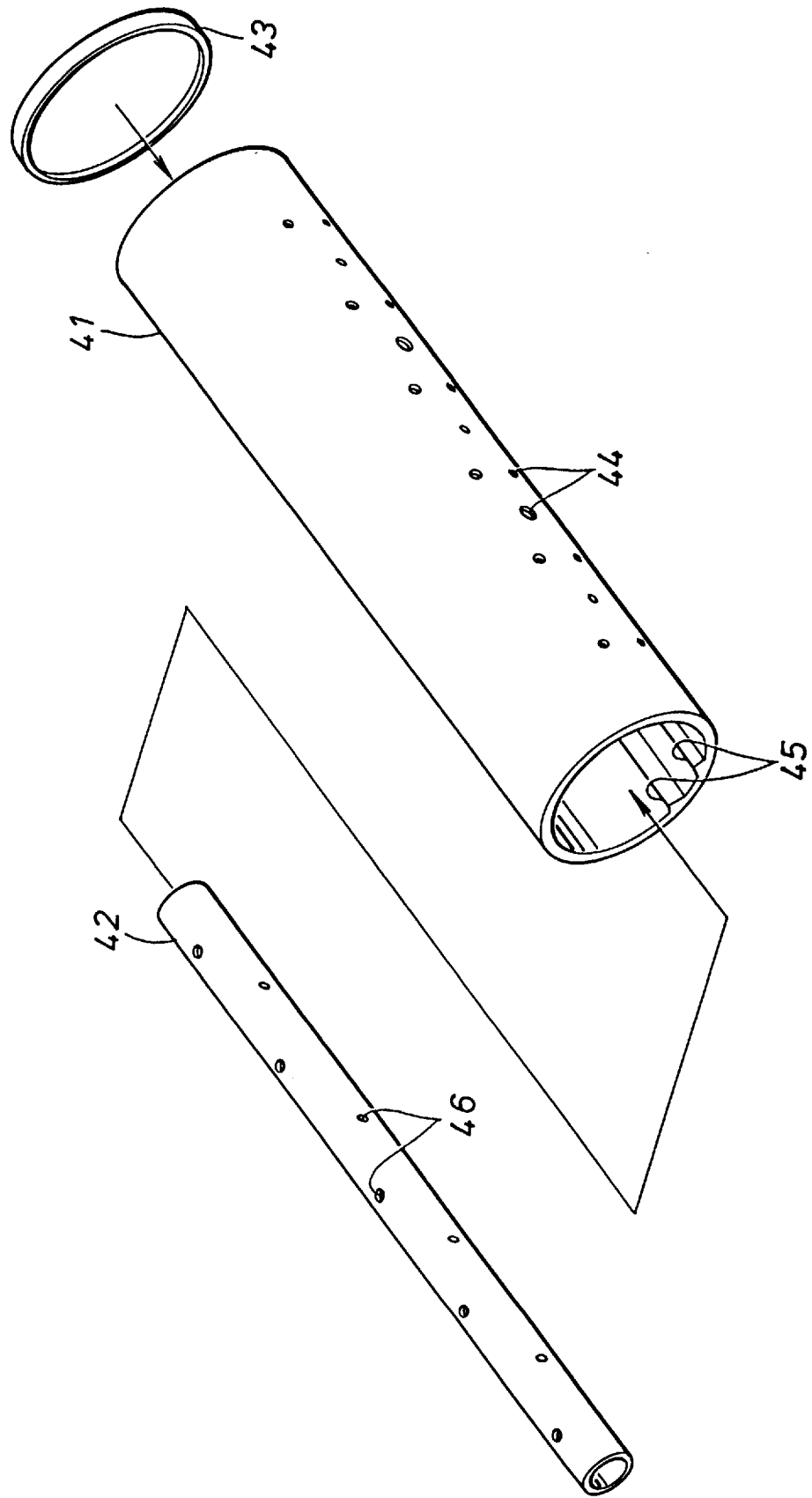
FIG. 11 is a simplified exploded perspective view of a ninth embodiment of the inflator assembly according the present invention.

FIG. 11 shows a simplified view of a ninth embodiment of the present invention. This inflator assembly comprises a hollow and cylindrical housing main body 41 having a circular cross section. The inflator assembly further comprises an ignition pipe 42 which extends over the entire length of the housing main body 41 inside the housing main body 41, and a bottom plate 43 which closes an axial end of the housing main body 41. The ignition pipe 42 is fixedly attached to the inner side wall of the housing main body 41 and the end plate 43 by welding or by brazing. The inner surface of the housing main body 41 is provided with a pair of ridges 45 which extend along the length of the housing main body 41 and are spaced from each other so that the ignition pipe 42 may be snugly received between them. One side of the housing main body 41, which is approximately 90 degrees displaced from the ignition pipe 42, is provided with a plurality of through holes 44 for ejecting gas out of the housing main body 41. These holes 44 are arranged in a plurality of rows along the length of the housing main body 41, and consist of relatively small holes and relatively large holes.

The ignition pipe 42 is filled with an igniting agent, and is provided with a plurality of small holes 46 for ejecting igniting flashes therefrom. When the igniting agent is ignited by an igniter not shown in the drawing, the resulting igniting flashes cause the propellant filled inside the housing main body to burn, thereby releasing the gas required for inflating the air bag.

One of the axial end of the housing main body 1 is closed by the bottom plate 43 as mentioned earlier, but the other axial end is adapted to be closed by a lid plate (not shown in the drawing) by using suitable threaded bolts or by forming a thread in the lid plate which engages with a corresponding thread which may be provided in the housing main body 41 although such arrangements are not shown in the drawing.

Figure 12:
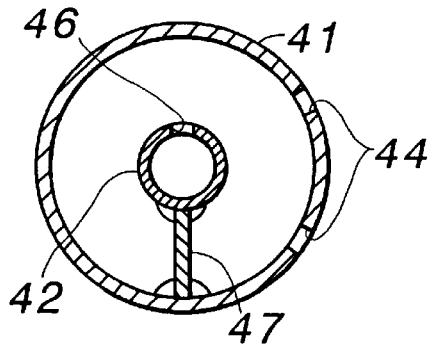
FIGS. 12 to 16 are cross sectional views of tenth to fourteenth embodiments of the inflator assembly according the present invention.

It is important to accurately position the ignition pipe 42 inside the housing main body 41 so that the combustion of the propellant may progress in a uniform fashion. FIG. 12 shows a tenth embodiment of the present invention which employs a leg section 47 made of a strip of plate for supporting the ignition pipe 42 centrally or coaxially in the housing main body 41. In this embodiment, the leg section 47 extends substantially over the entire length of the housing main body 41, and is attached to the ignition pipe 42 and the housing main body 41 by welding or brazing.

Figure 13:
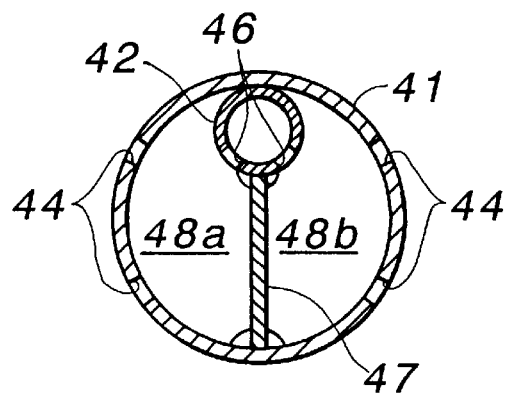

For uniform combustion to take place inside the housing main body 41, it is essential that the ignition pipe 42 extends accurately in parallel with the axial line of the housing main body. According to an eleventh embodiment illustrated in FIG. 13, the ignition pipe 42 is directly attached to the inner wall surface of the housing main body 41, and is connected to the diametrically opposing part of the inner wall surface of the housing main body 41 via a leg section 47 similar to that of the previous embodiment. As a result, the interior of the housing main body 41 is divided into two mutually symmetric combustion chambers 48a and 48b.

Figure 14:
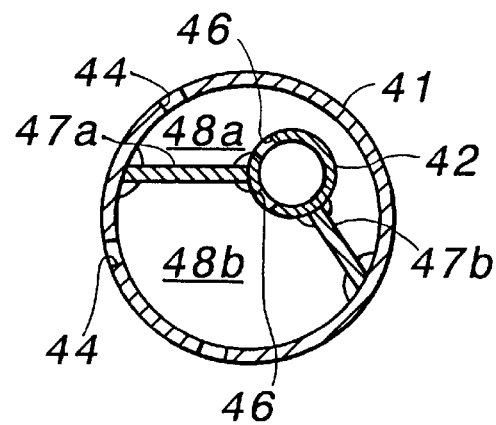

FIG. 14 shows a twelfth embodiment of the present invention, in which the ignition pipe 42 is supported inside the housing main body 41 by a pair of leg sections 47a and 47b each consists of a plate strip. The interior of the housing main body 41 is thus separated into two combustion chambers 48a and 48b, and the ignition pipe is provided with small holes 46 for emitting igniting flashes which include those directed to one of the two chambers and those directed to the other of the two chambers. If desired, a different number of leg sections may be used for supporting the ignition pipe 42.

Figure 15:
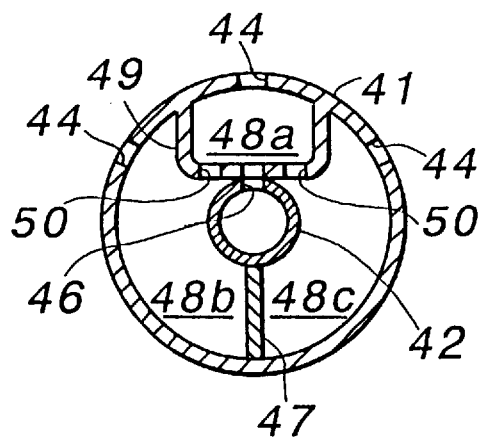

FIG. 15 shows a thirteenth embodiment of the present invention, in which the housing main body 41 is cylindrical in shape, and has a circular cross section. The housing main body 41 is provided with a perforated section, including a plurality of gas ejection holes 44 formed therein, on one side of the housing main body 41. A rectangular wall section 49 is integrally formed on an inner surface of a part of the housing main body 41 corresponding to a central area of the perforated section. The rectangular wall section 49 is formed by extruding an aluminum alloy along with the housing main body 41. Additionally, an ignition pipe 42 is centrally supported inside the housing main body 41 by a leg section 47 extending toward the opposite inner surface of the housing main body 41, and also abuts a part of the rectangular wall section 49. The ignition pipe 42 and the leg section 47 are attached to each other and to the wall section 49 and the housing main body 41 by welding or brazing.

A plurality of holes 46 are formed in the ignition pipe 42 which align with corresponding holes provided in the rectangular wall section 49 to communicate the interior of the ignition pipe 42 with a first combustion chamber 48a defined inside the rectangular wall section 49. The rectangular wall section 49 is further provided with openings 50 communicating the first combustion chamber 48a with second and third combustion chambers 48b and 48b defined on either side of the ignition pipe 42 and the leg section 47. As one can readily appreciate, the inflator assembly is symmetric about a diametric line passing through the center of the ignition pipe 42 and the leg section 47.

According to this embodiment, it is possible to control the progress of combustion inside the inflator assembly. When an igniter received inside the ignition pipe 42 is ignited, igniting flashes are ejected from the holes 46 of the ignition pipe 42 which in turn ignite the propellant in the first combustion chamber 48a. A part of the gas resulting from the combustion in the first combustion chamber 48a is released from the gas ejection holes 44 formed in the first combustion chamber 48 to slightly inflate the air bag, and rupture a shroud covering the air bag. The remaining part of the gas is introduced into the second and third combustion chambers 48b and 48c, and ignites the propellant therein. The resulting gas is ejected from the gas ejection holes 44, and is used for rapidly deploying the air bag. By controlling the combustion of the propellant, it is possible to reduce the heat loss and put the air bag ready for rapid inflation in the initial stage so that the energy produced from the propellant is efficiently utilized, and the speed of deploying the air bag can be maximized for the given amount of propellant.

Figure 16:
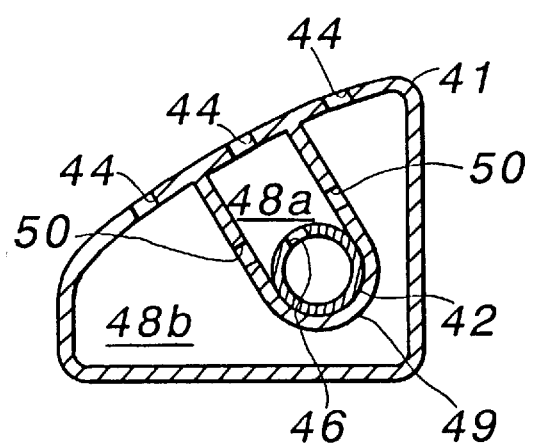

FIG. 16 shows a fourteenth embodiment of the present invention, in which the housing main body 41 is provided with a triangular cross section having a comer substantially defining a 90-degree angle. The long side opposing the 90-degree comer is provided with a perforated section having a plurality of through holes 44 for gas ejection, and a wall section 49 extends from the perforated section to define a first combustion chamber 48a therein. Therefore, some of the gas ejection holes 44 are communicated with the first combustion chamber 48a and the remaining part of the gas ejection holes 44 are communicated with a second chamber 48b which is defined in the remaining part of the interior of the housing main body 41. An ignition pipe 42 is received inside the first combustion chamber 48a, and placed against a part of the inner surface of the wall section 49.

The ignition pipe 49 is provided with a plurality of holes 46 opening into the first combustion chamber 48a, and the wall section 49 is provided with a plurality of communication holes 50 for communicating the first chamber 48a with the second chamber 48b. These holes 50 are arranged in a single row along the axial direction on each side of the ignition pipe 42.

The wall section 49 is integrally formed with the housing main body 41 by extruding aluminum alloy, and the ignition pipe 42 is attached to the wall section 49 by welding or brazing. If desired, the wall section 49 may also be separately formed and attached to the housing main body 41 by welding or brazing.

Figure 17:
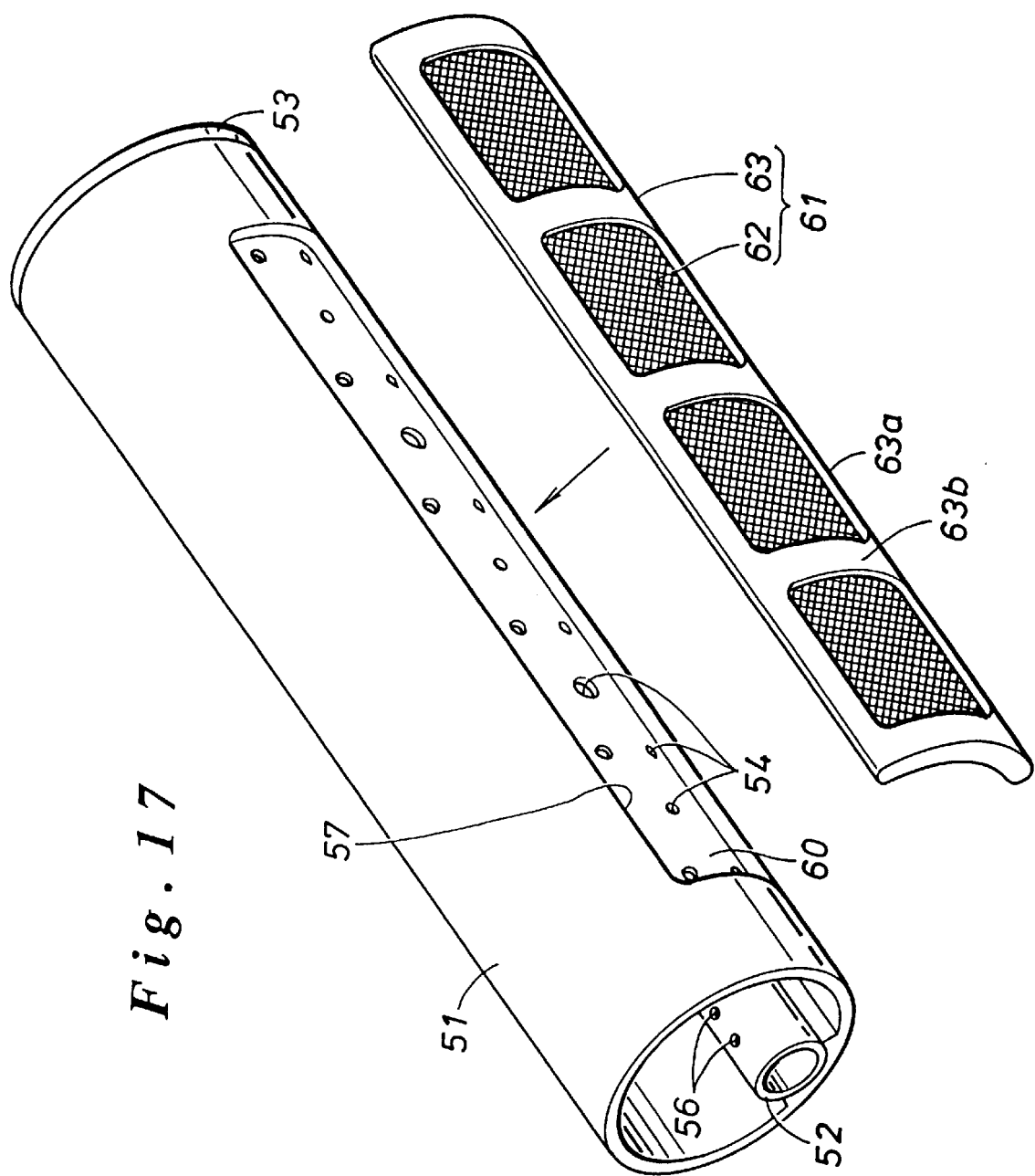
FIG. 17 is a simplified exploded perspective view of a fifteenth embodiment of the inflator assembly according the present invention.
Figure 18:
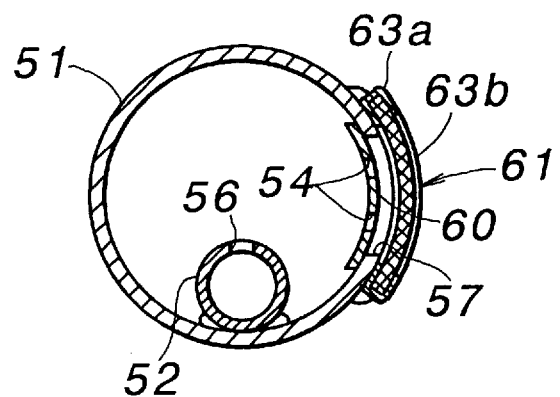
FIG. 18 is a cross sectional view of the inflator assembly shown in FIG. 17.

FIGS. 17 and 18 show a fifteenth embodiment of the present invention. This inflator assembly comprises a cylindrical housing main body 51 having a circular cross section, an ignition pipe 52 extending along the axial line of the housing main body 51 and placed against an inner side of the housing main body 51, and a bottom plate 53 closing an axial end of the housing main body 51. The ignition pipe 52 is attached to the housing main body 51 by welding or brazing, and the bottom plate 53 is attached to both the housing main body 51 and the ignition pipe 52 by welding or brazing.

The housing main body 51 is provided with an axially elongated rectangular window opening 57 on a side of the housing main body 51 which is about 90 degrees offset from the ignition pipe 52. The window opening 57 is closed from inside by a perforated plate 60 having a plurality of through holes 54 for ejecting gas by welding or brazing. A filter assembly 61 is placed over the window opening 57 from outside. The filter assembly 61 comprises a filter element 62 consisting of a plurality of layers of wire mesh having different properties, and a frame member 63 which retains the filter element 62, and is attached to the outer surface of the housing main body 51 by welding or brazing. The frame member 63 includes a peripheral part 63a and barrow strips 63b extending laterally across the frame member 63.

The ignition pipe 52 is formed with a plurality of holes 56 arranged in a single row in the axial direction. When the igniter is ignited inside the ignition pipe 52, ignition flashes are ejected from these holes 56 and ignite the propellant received in the combustion chamber defined by the outer surface of the ignition pipe 52 and the inner surface of the housing main body 51. The other axial end of the housing main body 51 is closed by a lid plate by using means such as threaded means other than welding or brazing.

Figure 19:
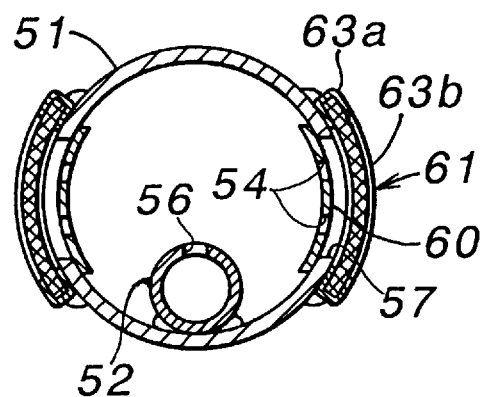
FIG. 19 is a cross sectional view of a sixteenth embodiment of the inflator assembly according the present invention.

FIG. 19 shows a sixteenth embodiment of the present invention similar to that shown in FIGS. 17 and 18. In this embodiment, the housing main body 51 is provided with a pair of window openings 57 at diagonally opposing positions, each of which is closed by a perforated plate 54 having a plurality of through holes 54 formed therein. Each of the window openings 57 is individually provided with a filter assembly 61. According to the present invention, the gas resulting from combustion of the propellant inside the housing main body 51 is directed in two opposite directions which are 180 degrees apart.

Figure 20:
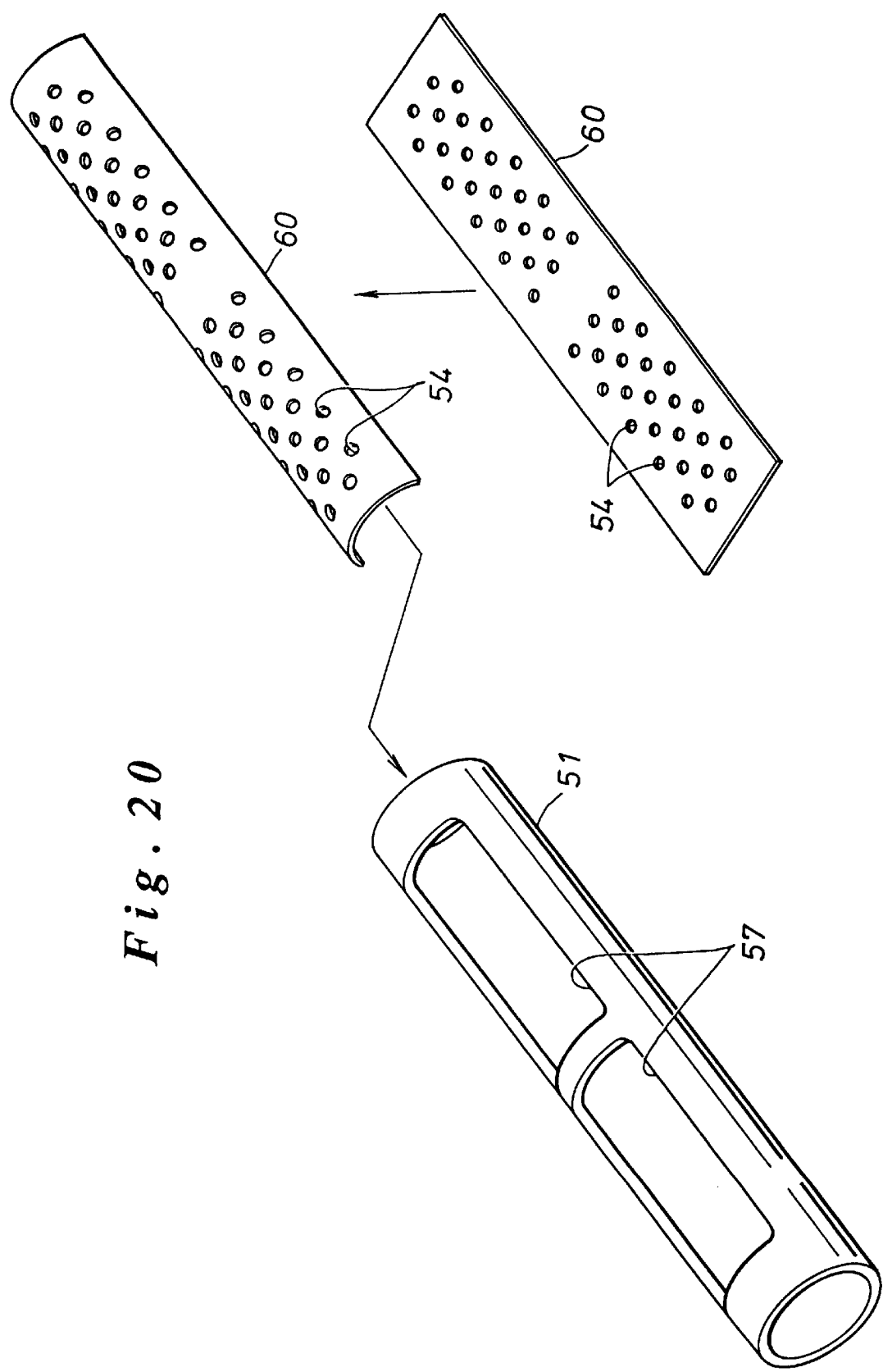
FIG. 20 is a simplified exploded perspective view of an arrangement for placing a perforated plate on a housing main body.
Figure 21:
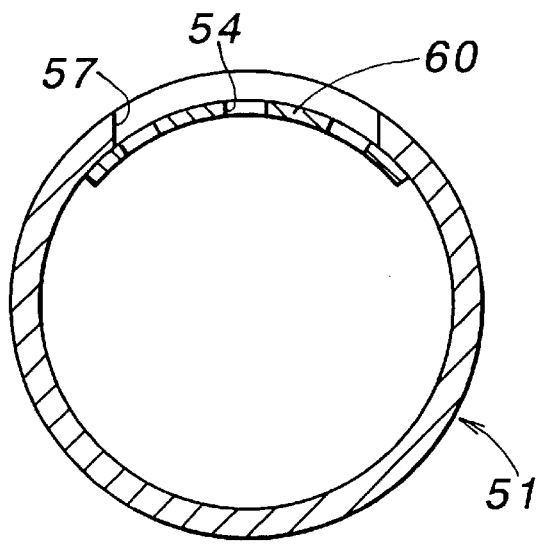
FIG. 21 is a cross sectional view of the inflator assembly shown in FIG. 20.

FIGS. 20 and 21 show a simplified arrangement for the inflator assembly according to the present invention to illustrate the structure of the perforated plate. According to this arrangement, the housing main body 51 is provided with a pair of axially elongated rectangular window openings 57 arranged along the axial direction. These window openings 57 are closed by a perforated plate 60 which is provided with a plurality of through holes 54 and attached to the inner surface of the part of the housing main body 51 surrounding the window openings 57. The gas produced from the combustion of the propellant inside the housing main body 51 therefore issues from these through holes 54 in one direction.

The perforated plate 60 is prepared as described in the following. First of all, the through holes 54 are formed by stamping or drilling, and the perforated plate 60 is curved by press forming so as to conform to the inner surface of the housing main body 51. The perforated plate 60 is then attached to the part of the inner surface of the housing main body 51 surrounding the window openings 57.

Figure 23:
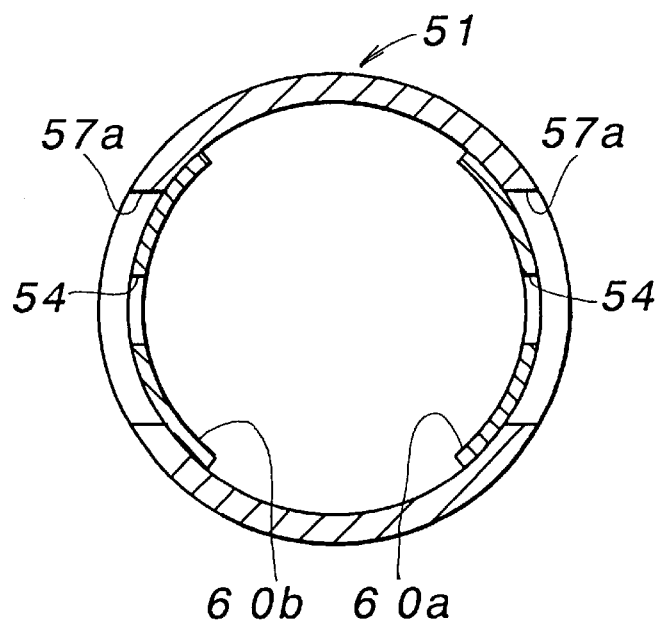
FIG. 23 is a cross sectional view of the inflator assembly shown in FIG. 22.

It is also possible to form a pair of windows openings 57a and 57b at diagonally opposing sides of the housing main body 51 as illustrated in FIGS. 22 and 23. A pair of perforated plates 60a and 60b are attached to the inner surface of the housing main body 51 so as to close the two windows openings 57a and 57b from inside, respectively. It is also possible in the arrangements illustrated in FIGS. 20 to 23 to attach the perforated plates to the housing main body from outside so as to close the corresponding window openings. By thus forming the perforated plates separately from the housing main body, it is possible to simplify the process of forming the through holes for releasing the gas out of the inflator assembly.

Although the present invention has been described in terms of a specific embodiment thereof, it is possible to modify and alter details thereof without departing from the spirit of the present invention. For other possible arrangements for implementing the present invention, reference should be made to copending patent application Ser. No. 08/745,630 filed Nov. 8, 1996.

The contents of this copending application are hereby incorporated in the present invention by reference.

What we claim is:

1. An inflator assembly for a vehicle air bag system, comprising:

a cylindrical housing main body having at least one perforated section formed on one side of said housing main body, and containing a propellant in a combustion chamber defined inside said housing main body, said perforated section being a perforated plate member provided with a plurality of through holes attached to a part of an inner surface of said housing main body surrounding a window opening provided in said housing main body;

an ignition pipe containing an igniting agent therein and provided with a plurality of holes for emitting igniting flashes into said combustion chamber; and end plates closing two axial ends of said housing main body.

2. An inflator assembly according to claim 1, wherein said ignition pipe is attached to said housing body.

3. An inflator assembly according to claim 1, further comprising a leg section which is interposed between said ignition pipe and said housing main body.

4. An inflator assembly according to claim 1, wherein at least one of said end plates is provided with an opening for placing an igniting agent or a propellant inside said housing main body which can be closed with plug means.

5. An inflator assembly according to claim 1, wherein at least one of said end plates is provided with an opening for placing an igniting agent or a propellant inside said housing main body which can be closed with plug means.

6. An inflator assembly according to claim 1, wherein said ignition pipe extends substantially over an entire length of said housing main body.

7. An inflator assembly according to claim 6, wherein said ignition pipe is directly supported on an inner surface of said housing main body.

8. An inflator assembly according to claim 6, wherein said ignition pipe is supported on an inner surface of said housing main body via a leg section.

9. An inflator assembly according to claim 6, wherein said ignition pipe is supported on an inner surface of said housing main body via a wall section defining a first combustion chamber which communicates with both said ignition pipe and a remaining part of said housing main body.

10. An inflator assembly according to claim 1, wherein said housing main body is provided with a relatively planar side, and said perforated section is provided in said relatively planar side of said housing main body.

11. An inflator assembly according to claim 1, further comprising a pair of guide ridges in parts of an inner surface of said housing main body extending along either side of said window opening for guiding said perforated plate member.

12. An inflator assembly according to claim 1, further comprising a pair of guide grooves extending along either side of said window opening for axially receiving lateral edges of said perforated plate member to retain said perforated plate member therein.

13. An inflator assembly according to claim 1, further comprising a filter assembly which is placed over said perforated section.

14. An inflator assembly according to claim 13, wherein said filter assembly comprises a filter element and a frame member retaining said filter element, and attached to said housing assembly.

15. An inflator assembly according to claim 14, further comprising a pair of guide ridges in parts of an outer surface of said housing main body extending along either side of said window opening for guiding said filter assembly.

16. An inflator assembly according to claim 14, further comprising a pair of guide grooves extending along either side of said window opening for axially receiving said filter assembly to retain said filter assembly therein.

17. An inflator assembly for a vehicle air bag system, comprising:

a cylindrical housing main body having a cross section which is symmetrical about a Y-axis, a perforated section, provided with a plurality of through holes, being formed adjacent to said Y-axis on one side of said housing main body and symmetrical about said axis;

an ignition pipe containing an igniting agent therein and extending axially inside said housing; and a pair of side walls extending between said ignition pipe and said perforated section substantially in parallel with said Y-axis and defining a first combustion chamber between said side walls, and a second combustion chamber between an inner surface of said housing main body and said side walls, a propellant being filled in said first and second chambers;

said ignition pipe being provided with a row of small holes directed centrally toward said first combustion chamber and extending axially along said ignition pipe;

said side walls being provided with a plurality of communication holes for communicating said first combustion chamber with said second combustion chamber in a symmetric arrangement;

said combustion holes being located in third and fourth quadrants of a Cartesian coordinated system defined in a cross sectional plane by said Y-axis, an origin located in a geometric center of said combustion chamber, and a X-axis passing through said origin at right angle to said Y-axis.

18. An inflator assembly according to claim 17, wherein said communication holes are directed away from said perforated section with respect to said X-axis.

19. An inflator assembly according to claim 17, wherein said housing main body has an elliptical cross section with a minor diameter thereof aligning with said Y-axis.

20. An inflator assembly according to claim 17, wherein said side walls are formed by a single piece of plate having a pair of sections each extending between said perforated section and said ignition pipe.

21. An inflator assembly according to claim 20, wherein a bight section of said single piece of plate extends around said ignition pipe, and is attached to both said ignition pipe and said housing main body.

22. An inflator assembly according to claim 20, wherein a bight section of said single piece of plate abuts said perforated section, and free ends of said sections abut said ignition pipe.

23. An inflator assembly according to claim 22, wherein said ignition pipe is provided with a leg section which extends between said ignition pipe and an opposing wall of said housing main body.

24. An inflator assembly according to claim 17, wherein a part of said through holes in said perforated section communicate with said first combustion chamber.

25. An inflator assembly according to claim 18, wherein said communication holes are provided in parts of said side walls which diverge away from each other as said side walls extend away from said ignition pipe.

26. An inflator assembly for a vehicle air bag system, comprising:

a cylindrical housing main body having a cross section which is symmetric about a line of symmetry defined in a cross sectional plane, a perforated section, provided with a plurality of through holes, formed adjacent to said line of symmetry on one side of said housing main body and symmetric about said line of symmetry, an ignition pipe containing an igniting agent therein and extending axially inside said housing main body; and a pair of side walls extending between said ignition pipe and said perforated section substantially in parallel with said line of symmetry and defining a first combustion chamber between said side walls, and a second combustion chamber between an inner surface of said housing main body and said side walls, a propellant being filled in said first and second chambers;

said ignition pipe being provided with a row of small holes directed centrally toward said first combustion chamber and extending axially along said ignition pipe;

said side walls being provided with a plurality of communication holes for communicating said first combustion chamber and said second combustion chamber in a symmetric arrangement;

said communication holes being directed away from said perforated section with respect to a lateral line crossing said line of symmetry in said cross sectional plane.

27. An inflator assembly according to claim 26, wherein said communication holes are provided in a relatively lower part of said combustion chamber.

* * * * *